United States Patent Office 3,503,931
Patented Mar. 31, 1970

3,503,931
HIGH MOLECULAR WEIGHT AROMATIC POLY-
AMIDES CONTAINING ETHER GROUPS
Eduard Radlmann, Eckart Reese, and Gunther Nischk,
Dormagen, Germany, assignors to Farbenfabriken
Bayer Aktiengesellschaft, Leverkusen, Germany, a corporation of Germany
No Drawing. Filed Aug. 8, 1968, Ser. No. 751,043
Claims priority, application Germany, Aug. 17, 1967,
F 53,260
Int. Cl. C08g 20/20
U.S. Cl. 260—49                                2 Claims

ABSTRACT OF THE DISCLOSURE

High molecular weight aromatic polyamides that are soluble in polar organic solvents by polycondensation of aromatic dicarboxylic acid dihalides with aromatic polyether diamines of the general formula

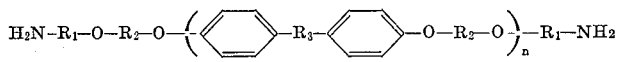

wherein $R_1$ represents a bivalent aromatic radical which may be substituted or not, $R_2$ represents an arylene radical selected from the group consisting of a phenylene, a naphthylene, a diphenylene radical which may be substituted or not and a radical of the formula

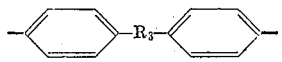

wherein $R_3$ represents a sulphoxide, sulphonyl, carbonyl, lower alkylene, cycloalkylene or arylalkylene radical and $n$ represents an integer from 2 to 20.

---

This invention relates to high molecular weight aromatic polyamides which are heat-resistant and soluble in polar organic solvents and to a process for their production by polycondensation of aromatic dicarboxylic acid halides with high molecular weight ether diamines.

It is known that temperature-resistant aromatic polyamides can be produced by condensing low molecular weight aromatic primary diamines with aromatic dicarboxylic acid chlorides either by an interface reaction or in solution. The polyamides that can be obtained by this method are soluble in polar organic solvents, such as N-alkylated pyrrolidones, N,N-dialkyl acetamides or tetramethylene sulphone, even at boiling temperature, only in such limited amounts that they cannot be converted into films or fibres without the assistance of solution promoters, for example lithium chloride or calcium chloride. In order to avoid undesirable shortcomings in the properties of the polyamides, it is necessary, but difficult on an industrial scale, to remove the inorganic salts used as solution promoters from the high molecular weight polyamide films and fibres.

It is an object of this invention to provide high molecular weight aromatic polyamides that are soluble in polar organic solvents without the necessity of adding a solution promoter. It is another object of this invention to provide heat-resistant aromatic polyamides.

These objects are accomplished by high molecular weight aromatic polyamides corresponding to the general formula

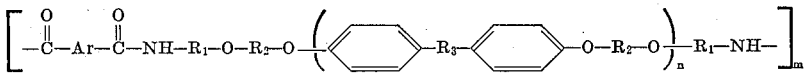

wherein Ar represents a bivalent aromatic radical comprising one or more aromatic rings which can be condensed or linked together by a single bond, an alkylene group, an oxygen or sulphur atom or an $—SO_2—$ or $—CO—$ grouping, $R_1$ represents a bivalent aromatic radical which may be substituted or not, $R_2$ represents an phenylene, naphthylene, or diphenylene radical which may be substituted or not or a radical of the formula

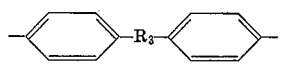

and $R_3$ represents a sulphoxide, sulphonyl, carbonyl, lower alkylene, cycloalkylene or arylalkylene radical, $n$ represents an integer from 2 to 20 and $m$ represents an integer of greater than 5, said polyamides having an inherent viscosity $$\eta_{inh.} = \frac{1n\ \eta_{rel}}{c}.$$

of greater than 0.8 ($c$=concentration in grams per 100 cc. solution). It is another object of this invention to provide a process for the production of high molecular weight aromatic polyamides that are resistant to high temperatures and soluble in polar organic solvents, which comprises reacting an aromatic dicarboxylic acid dihalide or a mixture of such dicarboxylic acid dihalides with a high molecular weight aromatic polyether diamine of the general formula

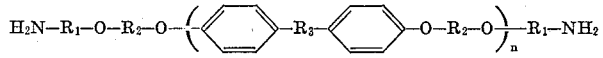

wherein $R_1$ represents a bivalent aromatic radical which may be substituted or not, $R_2$ represents a phenylene, naphthylene, or diphenylene radical which may be substituted or not or a radical of the formula

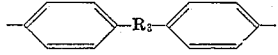

$R_3$ represents a sulphoxide, sulphonyl, carbonyl, lower alkylene, cycloalkylene or arylalkylene radical and $n$ represents an integer from 2 to 20, said reacting being effected at a temperature of from $-30$ to $+100°$ C. in a polar organic solvent.

The high molecular weight aromatic ether diamines used to prepare the polyamides may be produced by reacting aromatic polyether containing terminal alkali metal phenolate groups with aromatic halogenated hydrocarbons having one nitro group in the ortho- or para-position, and catalytically reducing the resulting dinitro compounds to form the corresponding diamines. For example, a bis-alkalimetal salt of a bis-phenol (for example 4,4'-dihydroxydiphenyl), can be reacted with an aromatic bis-halogen compound (for example 4,4'-dichloro-diphenyl sulphone) in a polar organic solvent (for example dimethyl sulphoxide) at a temperature above 60° C. in a molar ratio of from 2:1 to slightly greater than 1:1; the resulting polyether containing terminal alkali metal phenolate groups can be further reacted with an aromatic halogen nitro compound (for example 4-nitrochlorobenzene); and the resulting dinitro compound can be reduced, using Raney nickel in an organic solvent in the presence of hydrogen, thus yielding a polymer homologous mixture of aromatic polyether diamines.

It is also possible to react aromatic polyethers containing terminal halogen groups with alkali metal salts of mononitro phenols to give the dinitro compounds which are then catalytically reduced to give the corresponding diamines.

The high molecular weight ether diamines that are obtained correspond to the following general formula

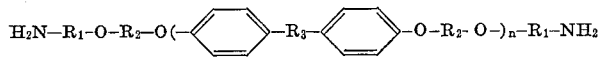

wherein $R_1$ represents a bivalent aromatic radical which may be substituted or not such as phenylene, naphthylene, diphenylene, alkylene-phenylene or alkylene-naphthylene, $R_2$ represents a phenylene, naphthylene, or diphenylene radical which may be substituted or not or a radical of the general formula

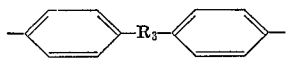

$R_3$ represents a sulphoxide, sulphonyl, carbonyl lower alkylene, cycloalkylene or arylalkylene radical, and n represents an integer from 2 to 20.

The terminal amino group content, and hence the average molecular weight of the high molecular weight diamine, is determined by analytical methods, for example by titration with perchloric acid, in order to enable the diamine to be used in exact stoichiometric quantities in the polycondensation reaction with dicarboxylic acid dihalides.

Dicarboxylic acid dihalides suitable for the preparation of the new polyamides include aromatic dicarboxylic acid dihalides of the general formula

wherein Y represents halogen and Ar represents a bivalent aromatic radical comprising one or more aromatic rings which can be condensed or linked, together by a single bond or by an alkylene group, an oxygen or sulphur atom or an —$SO_2$— or —CO— radical. The following are examples of such dicarboxylic acid dihalides: Diphenyl-4,4'-dicarboxylic acid dichloride; diphenyl sulphone-4,4'-dicarboxylic acid dichloride; diphenyl ether-4,4'-dicarboxylic acid dichloride; naphthalene-1,5-dicarboxylic acid dichloride. Preferred are isophthalic acid dichloride and terephthalic acid dichloride.

The process according to the invention may also be carried out by reacting an aromatic acid dihalide with a mixture of a low molecular weight aromatic diamine and a high molecular weight aromatic ether diamine or by reacting a mixture of different aromatic dicarboxylic acid dihalides with a high molecular weight aromatic ether diamine or with a mixture of a low molecular weight and a high molecular weight aromatic diamine. The following diamines, for example, may be used as the low molecular weight diamines: 4,4'-diaminodiphenyl ether; 4,4'-diaminodiphenyl methane; 4,4'-diaminodiphenyl-2,2-propane; 1,3-diaminobenzene; 1,4-diaminobenezene; 4,4'-diaminodiphenyl sulphone; benzidine; 4,4' - diaminodiphenyl sulphide; 3,3'-diaminodiphenyl sulphone; bis(4-aminophenyl)-phosphine oxide; bis-(4-aminophenyl)-diethyl silane; m-xylylene diamine; 2,6-diaminopyridine; 1,5-diaminonaphthalene; 3,3'-dimethyl-4,4'-diaminodiphenyl; 3,3'-dimethoxy benzidine; 1,5-di-(p-aminophenoxy)-naphthalene; 2,6-di-(p-aminophenoxy)-naphthalene; 4,4'-di-(p-aminophenoxy)-diphenyl; 4,4'-di-(p-aminophenoxy)-diphenyl methane; 4,4'-di- p-aminophenoxy)-diphenyl-2,2-propane; 4,4'-di-(p-aminophenoxy)-diphenyl ether; 4,4'-di-(p-aminophenoxy)-diphenyl sulphide; 4,4'-di-(p-aminophenoxy)-diphenyl sulphone; 4,4'-di-(2"chloro-4"-aminophenoxy)-diphenyl-2,2-propane; and 1,4-(2'-chloro-4'-aminophenoxy)benzene.

The reaction of the dicarboxylic acid dihalides with the diamines is carried out in polar organic solvents, for example pyridine; N,N-dialkyl-substituted carboxylic acid amides such as N,N-dimethyl acetamide; or N-alkylated pyrrolidones including inter alia N-methyl pyrrolidone. When solvents of this kind are used, there is no need to add additional acid acceptors, in contrast to what is required with other polar organic solvents such as tetramethylene sulphone, where basic materials, such as lithium hydroxide or tertiary amines, have to be present in order to provide products having a high molecular weight.

In one preferred embodiment of the process according to the invention, the high molecular weight ether diamine is dissolved in a solvent containing a tertiary nitrogen atom, and the dicarboxylic acid dihalide, either in solution or in solid form, is added to the resulting solution with cooling, preferably in an equivalent quantity, either all at once or in small portions. Polyamides of the highest molecular weight are obtained when the molar ratio of aromatic dicarboxylic acid dihalide (or mixture of dihalides) to polyether diamine (or mixture of diamines) is 1:1. It is, however, also possible in principle to carry out the reaction with an excess of one of the two components. However, other methods, for example adding the diamine to a solution of the dicarboxylic acid dihalide, lead to products with excellent processing properties and high molecular weights. The reaction may be carried out at a temperature in the range from $-30$ to $+100°$ C. although it is preferably carried out at a temperature in the range from $-10$ to $+30°$ C.

In the polycondensation reaction, formation of the polymer is accompanied by the elimination of hydrogen halide. The solids content of the resulting polymer solutions may amount to from 5 to 40% by weight, a solids content of from 15 to 25% by weight being preferred. On completion of condensation, the polymer is precipitated by pouring the solution into an excess of water or organic precipitant. The high molecular weight polyamides obtained in this way are readily soluble at room temperature, both in dimethyl formamide and in pyridine, up to a concentration of 40% by weight. The inherent viscosities are above 0.8. Filaments, fibres and films can be produced from these solutions by known methods. The hydrogen-halide-containing solutions may, however, be directly converted into filaments and films without precipitation and re-solution.

In addition to their outstanding mechanical properties, the novel polyamides produced by the process according to the invention are highly stable both to heat and to oxidation. In contrast to the conventional, purely aromatic polyamides, the electrical properties of the new polymers are much more favourable, so that they satisfy the requirements which a good electrical insulating film or foil has to meet. Accordingly, they may also be used for the production of electrical insulating films or lacquers. It is also possible to convert the precipitated polyamides into filaments, films or mouldings from the melt.

The following examples are to illustrate the invention without limiting it.

The parts by weight indicated by the following examples are as to the parts by volume as kg. to litre.

EXAMPLE 1

109 parts by weight of the polymer homologous mixture of the polyether diamine of the formula

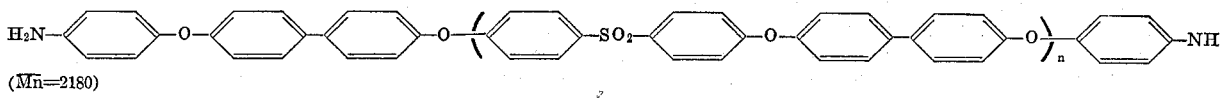

($\overline{Mn}$=2180)

are dissolved in 365 parts by weight of dry N-methyl pyrrolidone, and the resulting solution is cooled to 0° C. 10.15 parts by weight of isophthalic acid dichloride are introduced with stirring in several portions at 0° C. On completion of the addition, the mixture is stirred for 2 hours at 0° C. The cooling bath is then removed, and stirring is continued for another 4 hours at room temperature. The mixture is then diluted with 200 parts by

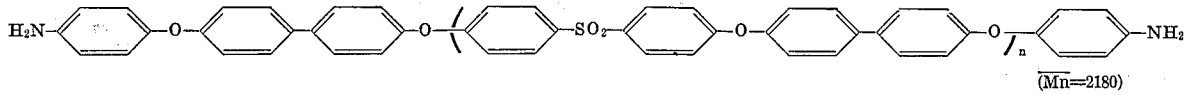

weight of dimethyl formamide, and the polyamide is precipitated by pouring into vigorously turbo-agitated water. After suction filtration, the polyamide is washed twice with hot water and dried in vacuo at 100° C. It has a melting range of from 280 to 350° C. and an inherent viscosity $$\left(\eta_{inh.} = \frac{\ln \eta_{rel.}}{c}\right) \text{ of } \eta_{inh.} = 1.10$$

(as measured on a N-methyl pyrrolidone solution of 0.5 g. of polyamide in 100 ml. solution at 25° C. in an Ubbelohde viscosimeter). Is is soluble in the cold in N,N-dimethyl formamide.

Preparation of the polymer homologous mixture of the aromatic polyether diamine:

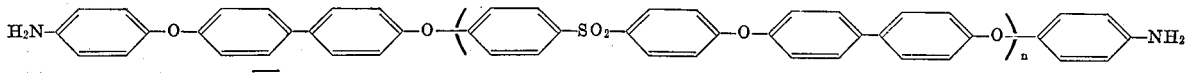

Molecular weight determined $\overline{Mn} = 2180$ 465 parts by weight of 4,4'-dihydroxyphenyl are dissolved in 4000 parts by volume of dimethyl sulphoxide. Following the addition of 280.5 parts by weight of solid, 100% potassium hydroxide. After dissolving at 100° C. the water formed during salt formation is distilled off in vacuo together with 5 to 10% of dimethyl sulphoxide. After cool-

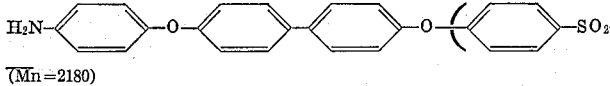

($\overline{Mn} = 2180$)

ing to room temperature, 574 parts by weight of 4,4'-dichlorodiphenyl sulphone are added. Condensation is continued with stirring at 125° C. for a period of 10 hours, during which nitrogen is passed through the reaction mixture. 236 parts by weight of 4-nitrochlorobenzene are then added at room temperature. The reaction mixture is reheated to 125° C. and condensed for 5 hours. It is then filtered to remove precipitated potassium chloride, and most of the dimethyl sulphoxide is removed in vacuo. The residue is heated with an acetone-methanol-mixture to boiling point, suction filtered and washed with methanol. The excess 4-nitrochlorobenzene is removed in this way. 845 parts by weight of the pale yellow coloured either sulphone oligomer mixture with terminal nitro groups, are isolated after drying in vacuo at 100° C. The material melts at temperatures in the range from 228 to 244° C.

805 parts by weight of the dinitro compound are dissolved in 3000 parts by volume of dimethyl formamide, and the resulting solution is hydrogenated for 3 hours in

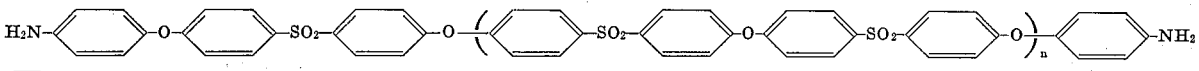

($\overline{Mn} = 1000$)

an autoclave with 70 parts by weight of Raney nickel at a temperature of 120° C. and under a hydrogen pressure of 50 atmospheres. Following removal of the reducing catalyst, most of the dimethyl formamide is distilled off in vacuo and the concentrated solution is precipitated by pouring into 1000 parts by volume of methanol with vigorous stirring (turbine impeller), suction filtered and dried in vacuo at 100° C. 735 parts by weight of the polymer homologous mixture of the diamine are obtained in pure form. The diamine melts at temperatures in the range from 239 to 249° C. Terminal amino group analysis, by titration with perchloric acid, reveals an average molecular weight for the diamine mixture of $\overline{Mn} = 2180$.

EXAMPLE 2

54.5 parts by weight of the polymer homologous mixture of the polyether diamine of the formula

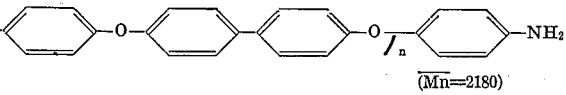

($\overline{Mn} = 2180$)

together with 5.0 parts by weight of 4,4'-diaminodiphenyl ether are dissolved in 365 parts by weight of dry N-methyl pyrrolidone, and 10.15 parts by weight of isophthalic acid dichloride being added in portions while stirring to the resulting solution after it has cooled to 0° C. After 1 hour, the cooling bath is removed. Stirring is continued for another 4 hours at room temperature. The reaction mixture is diluted with 200 parts by weight of dimethyl formamide, and worked up as described in Example 1. The polyamide has a melting range of 290–340° C., and an inherent viscosity of $\eta_{inh.} = 1.30$ (as measured on a solution of 0.5 g. of polyamide in 100 ml. of N-methyl pyrrolidone). It is soluble in N,N-dimethyl acetamide.

The polyether diamine used was prepared by the method described in Example 1.

EXAMPLE 3

109 parts by weight of the polymer homologous mixture of the polyether diamine of the formula

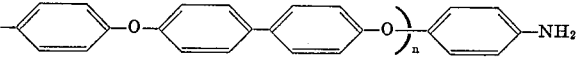

are dissolved in 365 parts by weight of dry N-methyl pyrrolidone and the resulting solution is cooled to 5° C. 10.15 parts by weight of terephthalic acid dichloride are then added to this solution with stirring in one batch. After 1 hour, the cooling bath is removed, and stirring is continued for 5 hours at room temperature. The viscous solution is diluted with 150 parts by weight of dimethyl formamide and worked up as described in Example 1. The polyamide isolated melts at temperatures in the range from 295 to 360° C. and has an inherent viscosity of $\eta_{inh} = 1.21$ (as measured on a solution of 0.5 g. of polyamide in 100 ml. of N-methyl pyrrolidone at 250° C.).

The material is readily soluble in N,N-dimethyl formamide.

The polyether diamine used was prepared by the method described in Example 1.

EXAMPLE 4

100.0 parts by weight of the polymer homologous mixture of the polyether diamine of the formula

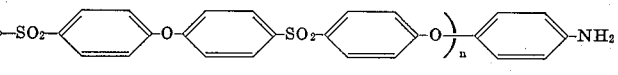

are dissolved in 537 parts by weight of absolute N,N-dimethyl acetamide, and the resulting solution is cooled to 0° C. 34.3 parts by weight of diphenyl sulphone-4,4'-dicarboxylic acid dichloride are then added in portions with stirring. After 60 minutes, the cooling bath is removed, and stirring is continued for 4 hours at room temperature.

The highly viscous polyamide solution is diluted with 200 parts by weight of N,N-dimethyl formamide, and the resulting product is worked up as described in Example 1. The colourless polyamide melts at temperatures in the range from 310 to 360° C. and has an inherent viscosity of $\eta_{inh}=1.18$ (as measured on a solution of 0.5 g. of polyamide in 100 ml. of N-methyl pyrrolidone). The polymer is soluble in dimethyl formamide.

Preparation of the polymer homologous mixture of the aromatic polyether diamine:

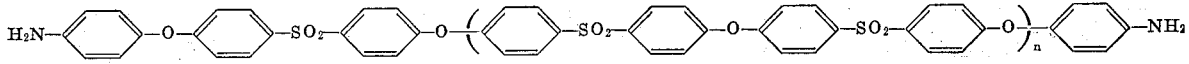

(Molecular weight determined $\overline{Mn}=1000$)

250.0 parts by weight of 4,4'-dihydroxy-diphenyl sulphone are dissolved in 1500 parts by volume of dimethyl sulphoxide. 600 parts by volume of benzene and a solution of 112.0 parts by weight of solid, 100% potassium hydroxide in 125 parts by volume of water, are added to the resulting solution. The water added and the water liberated during salt formation is azeotropically removed from the system while nitrogen is passed through the reaction mixture. All the benzene and some 5 to 10% of the dimethyl sulphoxide are thus distilled off in vacuo. After cooling to room temperature, 143.5 parts by weight of 4,4'-dichlorodiphenyl sulphone are added. Condensation is continued for 6 hours at 125° C. while nitrogen is passed through the reaction mixture. After cooling to room temperature, 166 parts by weight of 4-nitrochlorobenzene are added, followed by condensation for another 8 hours at 125° C. The product is then filtered to separate the precipitated potassium chloride and most of the dimethyl sulphoxide is removed in vacuo. The residue is brought to boiling point with methanol, suction filtered and washed with methanol. 410 parts by weight of a colourless mixture of the homologous polyether sulphone with terminal nitro groups are obtained after drying in vacuo at 80° C. The material melts at temperatures in the range from 148 to 155° C.

400 parts by weight of the dinitro compound are dissolved in 2000 parts by volume of dimethyl formamide, and the resulting solution is hydrogenated for four hours in an autoclave with 80 parts by weight of Raney nickel at a temperature of 60° C. and at hydrogen pressure of 50 atmos. After the Raney nickel has been separated, the product is precipitated by pouring into 2000 parts by volume of methanol with vigorous stirring (turbine impeller), suction filtered and dried in vacuo at 50° C. In this way, 302 parts by weight of the polymer homologous mixture of the polyether diamine are isolated in pure form. The diamine mixture melts at temperatures in the range from 162 to 170° C. Analysis of the terminal amino groups by titration with perchloric acid shows an average molecular weight of $\overline{Mn}=1000$.

EXAMPLE 5

A solution of 100.0 parts by weight of the polymer homologous mixture of the polyether diamine

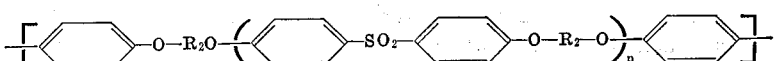

($\overline{Mn}=1000$)

in 403 parts by weight of N-methyl pyrrolidone is cooled to 0° C. 20.3 parts by weight of isophthalic acid dichloride are then added in portions with stirring and cooling. After 30 minutes, the cooling bath is removed, followed by stirring for 4 hours at room temperature. Following dilution with 100 parts by weight of N,N-dimethyl formamide, the product is worked up as described in Example 1. The polyamide has a melting range of from 280 to 295° C., and an inherent viscosity of $\eta_{inh}=1.02$ (as measured on a solution of 0.5 g. of polyamide in 100 ml. of N-methyl pyrrolidone). It is readily soluble in cold N,N-dimethyl formamide.

The polyether diamine used was prepared by the method described in Example 4.

What we claim is:

1. A high molecular weight film and fiber forming aromatic polyamide consisting essentially of the general formula

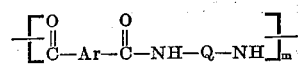

wherein Ar represents a bivalent aromatic radical selected from the group consisting of phenylene, naphthylene, diphenylene, diphenylene sulfone, diphenylene ether, diphenylene sulfide, diphenylene alkylene, and diphenylene carbonyl, and wherein Q is selected from the group consisting of (1) all Q's are

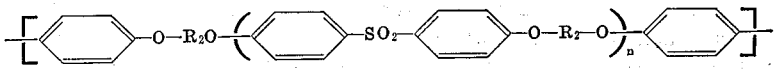

wherein $R_2$ is selected from the group consisting of diphenylene and diphenylene sulfone and $n$ is an integer from 2 to 20 and (2) some Q's are (1) and the remaining Q's are selected from the group consisting of diphenylene ether, diphenylene methane, diphenylene propane, phenylene, diphenylene sulfone, diphenylene, diphenylene sulfide, bis(phenylene)phosphine oxide, bis(phenylene diethyl silane, phenylene dimethylene, pyridylidene, naphthylidene, dimethyl diphenylene, dimethoxy diphenylene, di(phenylenoxy) naphthylene, di(phenylenoxy)diphenyl, di(phenylenoxy) diphenyl methane, di(phenylenoxy) diphenyl propane, di(phenylenoxy)diphenyl ether, di(phenylenoxy) diphenyl sulfide, di(phenylenoxy) diphenyl sulfone, di(chloro-phenylenoxy) diphenyl propane, and di(chloro-phenylenoxy) benzene and $m$ is an integer higher than 5 said polyamides having an inherent viscosity $$\eta_{inh}=\frac{\ln \eta_{rel.}}{c}$$

of greater than 0.8.

2. The polyamide of claim 1 wherein Q is (2) and the molar amount of said remaining Q's is up to 50% of the total Q's.

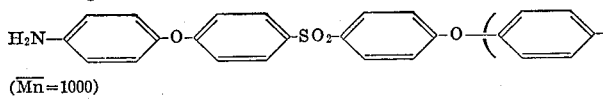

References Cited

UNITED STATES PATENTS 3,063,966  11/1962  Kwolek et al. _____ 260—78
3,197,434  7/1965   Preston et al. _____ 260—47

WILLIAM H. SHORT, Primary Examiner

L. L. LEE, Assistant Examiner

U.S. Cl. X.R.

260—30.8, 32.8, 47, 65, 78, 857